US012042800B2

(12) United States Patent
Adams et al.

(10) Patent No.: US 12,042,800 B2
(45) **Date of Patent: *Jul. 23, 2024**

(54) SEPARATION OF HEAVY FROM LIGHT AUTO SHREDDER RESIDUE

(71) Applicant: SA Recycling LLC, Orange, CA (US)

(72) Inventors: George Adams, Orange, CA (US); Alex Meza, Chino, CA (US); Clifford Glen Newby, Orange, CA (US); Mike Adams, Anaheim Hills, CA (US)

(73) Assignee: SA Recycling LLC, Orange, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/313,818

(22) Filed: May 8, 2023

(65) Prior Publication Data

US 2023/0271193 A1 Aug. 31, 2023

Related U.S. Application Data

(63) Continuation of application No. 17/674,435, filed on Feb. 17, 2022, now Pat. No. 11,679,394.

(51) Int. Cl.
*B03B 5/40* (2006.01)
*B03B 5/28* (2006.01)
(Continued)

(52) U.S. Cl.
CPC .................. *B03B 5/40* (2013.01); *B03B 9/06* (2013.01); *B03B 11/00* (2013.01); *B03B 2005/405* (2013.01); *B03B 2011/008* (2013.01)

(58) Field of Classification Search
CPC .. B03B 5/40; B03B 9/06; B03B 11/00; B03B 2005/405; B03B 2011/008
(Continued)

(56) References Cited

U.S. PATENT DOCUMENTS 2,465,220 A 3/1949 Garber
4,110,195 A 8/1978 Hardin
(Continued)

FOREIGN PATENT DOCUMENTS

GB 2381483 A 5/2003
GB 2395924 A 6/2004
(Continued)

OTHER PUBLICATIONS

Florigo, "Cyclone Destoner" Technews Florigo International NFlorigo International, The Netherlands, Mar. 2010. 4 Pages.
(Continued)

*Primary Examiner* — Michael McCullough
*Assistant Examiner* — Molly K Devine
(74) *Attorney, Agent, or Firm* — SoCal IP Law Group LLP; Guy Cumberbatch

(57) ABSTRACT

Systems and methods for separating heavier from lighter materials in mixed auto shredder residue (ASR) from end-of-life vehicles. Vehicles are shredded and the resulting mixed ASR is fed into a system that efficiently segregates heavier (typically metal) from lighter (typically plastic) pieces. The system has an inlet feed chute angled downward to a lower end over a separator tank filled with water. One or more nozzles configured to introduce water at a velocity into the separator tank create a flow of water across the tank to push smaller and lighter particles over an exit weir. Heavier particles sink toward a heavy matter removal conveyor having a lower end positioned within the separator tank so that the heavier particles are transported upward out of the separator tank. The heavy matter removal conveyor may be one or more Archimedes screws, a flat, ribbed or cleated conveyor, or a drag chain.

20 Claims, 5 Drawing Sheets

(51) Int. Cl.
*B03B 9/06* (2006.01)
*B03B 11/00* (2006.01)

(58) Field of Classification Search
USPC .......................................................... 209/156
See application file for complete search history.

(56) References Cited

U.S. PATENT DOCUMENTS

| | | | |
|---|---|---|---|
| 4,237,001 | A | 12/1980 | Walker |
| 8,777,016 | B2 | 7/2014 | Smith |
| 10,189,027 | B2 | 1/2019 | Adams et al. |
| 2010/0200474 | A1 | 8/2010 | Fendley |

FOREIGN PATENT DOCUMENTS

| | | | |
|---|---|---|---|
| KR | 100764643 | B1 | 10/2007 |
| RU | 2045351 | C1 | 10/1995 |
| WO | 2014172941 | A1 | 10/2014 |

OTHER PUBLICATIONS

Grewal, Ish, "Introduction to Mineral Processing," Met-Solve Laboratories, Inc., http://met-solvelabs.com/library/articles/mineral-processing-introduction, Accessed Feb. 2, 2016. 23 pages.

"New Recycling Process Reclaims More Usable Materials from End of Life . . . " Downloaded Feb. 4, 2016. https://https://www.automotiveplastics.com/Recycling-of-End-of-Life-Vehicles/.

Song, Chao; "Garbage Classifying and Recycling System and Garbage Classifying Method (English translation)", Oct. 30, 2014, www.worldwide.espacenet.com (Year: 2014).

Sung; Kim Hyo, "The Recycling Method and Its Apparatus For Construction Waste Matter" (English Translation), Oct. 8, 2007, worldwide.espacenet.com (Year: 2007).

SEPARATION OF HEAVY FROM LIGHT AUTO SHREDDER RESIDUE

REFERENCE TO RELATED APPLICATIONS

This patent application is a continuation of Ser. No. 17/674,435, filed Feb. 7, 2022.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to material separation, and in particular a separator system for sorting heavy from light materials in auto shredder residue from end-of-life vehicles.

Description of the Related Art

Approximately 12-15 million vehicles reach the end of their use each year in just the United States alone. For economic and ecological reasons, recovery of the metal and other materials contained in the scrap vehicles is becoming more important. About 65% of a typical car is made from steel, and the rest is made of other metals plus glass, rubber, foam and fiber.

The process of vehicle recycling typically first includes the pretreatment or de-pollution (e.g., removal of tires, battery, lubricants and fuel), shredding the vehicle using an industrial shredder (essentially a large hammer) to obtain auto shredder residue (ASR), and then sorting the pieces to recover valuable material. Sorting is typically accomplished with a series of devices—first to extract ferrous metal pieces and then to extract non-ferrous metal pieces. The rates at which the material separators work can limit productivity and thus profitability.

SUMMARY

A system for separating heavier from lighter materials within a stream of mixed auto shredder residue (ASR), comprises an inlet feed conveyor configured to receive a stream of mixed ASR having smaller and lighter particles and larger and heavier particles and deliver the stream of mixed ASR to an upper end of a feed chute, the feed chute being angled downward to a lower end. A separator tank filled with water is located underneath the feed chute so that mixed ASR falls into the tank from the lower end of the feed chute. The separator tank is defined on all sides by solid walls and has an exit weir on the side of the tank opposite a location where the mixed ASR falls into the tank, the exit weir generally determining the water level within the separator tank. A nozzle located underneath the lower end of the feed chute and above the water level within the separator tank configured to introduce water at a velocity into the separator tank and aimed to direct water across the separator tank toward the exit weir, the flow of water across the separator tank tending to push smaller and lighter particles over the exit weir. Finally, a heavy matter removal conveyor has a lower end positioned within the separator tank, the heavy matter removal conveyor being angled upward so that larger and heavier particles that sink downwards within the separator tank land on and are transported upward out of the separator tank, wherein larger and heavier particles tend to sink within the separator tank and therefore be separated from smaller and lighter particles.

Another embodiment of a system for separating heavier from lighter materials within a stream of mixed auto shredder residue (ASR), comprises a feed chute angled downward to a lower end and having an upper end positioned to receive a flow of mixed ASR having smaller and lighter particles and larger and heavier particles. A separator tank filled with water is located underneath the feed chute so that mixed ASR falls into the tank from the lower end of the feed chute. The separator tank is defined on all sides by solid walls and has an exit weir on the side of the tank opposite a location where the mixed ASR falls into the tank, wherein one of the solid walls of the separator tank comprises a vertical partition wall. The exit weir generally determines the water level within the separator tank. A nozzle located underneath the lower end of the feed chute and above the water level within the separator tank configured to introduce water at a velocity into the separator tank and aimed to direct water across the separator tank toward the exit weir, the flow of water across the separator tank tending to push smaller and lighter particles over the exit weir. A heavy matter removal conveyor has a first end positioned within the separator tank so that larger and heavier particles that sink downwards within the separator tank land on and are transported out of the separator tank, wherein larger and heavier particles tend to sink within the separator tank and therefore be separated from the smaller and lighter particles. The partition wall extends downward toward the first end of the heavy matter removal conveyor below the level of the exit weir, and the system further includes a secondary weir on an opposite side of the partition wall from the exit weir that is positioned lower than the exit weir.

In any system described herein, the feed chute may have a series of spaced stair steps that help separate heavier from lighter particles. The system may further include a water flow nozzle position at the top of the feed chute to facilitate movement of the mixed ASR down the feed chute.

In any system described herein, the heavy matter removal conveyor may comprise at least one Archimedes screw. If the system includes a partition wall, the partition wall is shaped at a lower edge to conform to the at least one Archimedes screw. There may be two Archimedes screws arranged side-by-side, and the partition wall lower edge may conform to both screws.

In any system described herein, the nozzle may be mounted to pivot to change the angle of the flow of water across the separator tank. Further, there may be a plurality of nozzles spaced apart in a line across a width of the separator tank.

Throughout this disclosure, elements appearing in figures are assigned three-digit reference designators, where the most significant digit is the figure number where the element is introduced and the two least significant digits are specific to the element. An element that is not described in conjunction with a figure may be presumed to have the same characteristics and function as a previously-described element having the same reference designator.

DETAILED DESCRIPTION

Systems and methods for separation system for sorting heavy from light materials are disclosed, and especially for recovery of metal material from end-of-life vehicles. In assembling a vehicle recycling system, the following are certain desirably attributes, in no particular order: high speed of processing; high quality of separation—each type of metal, and non-metals; low environmental impact; low need for manual labor. To further these goals there is provided a fluidic separator which is positioned functionally after the shredder and before other separators. Basically, the fluidic separator acts like an early filter stage taking out the bulk of the heavier and more valuable metal material.

As used herein, the terms "heavier" and "lighter" refer to relatively greater and lesser specific gravity, respectively. Within the fluidic separator, absolute weight is less important than buoyancy in the fluid.

Figure 1:
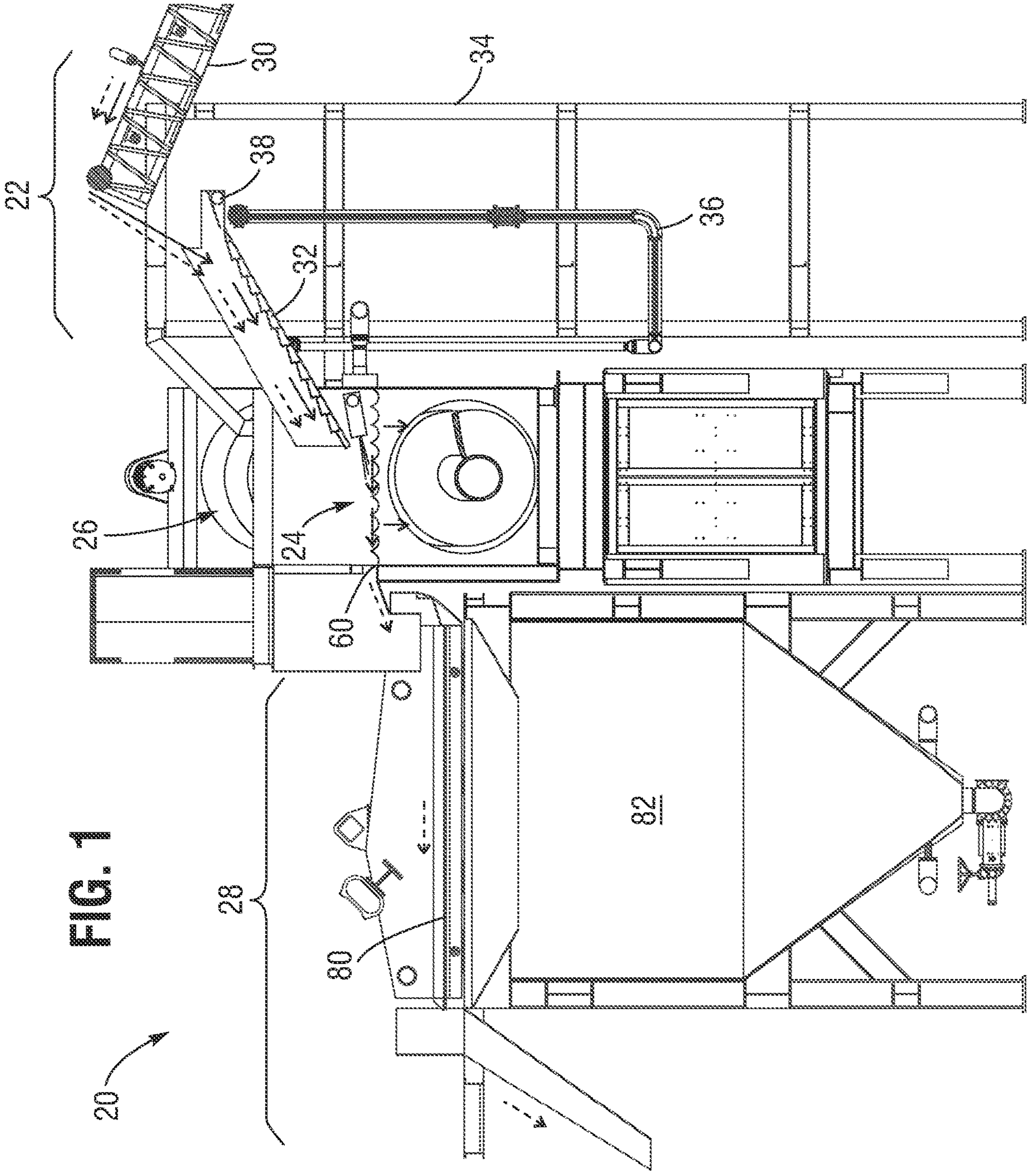
FIG. 1 is a front view of a separator system for sorting heavy from light materials in auto shredder residue.
Figure 2:
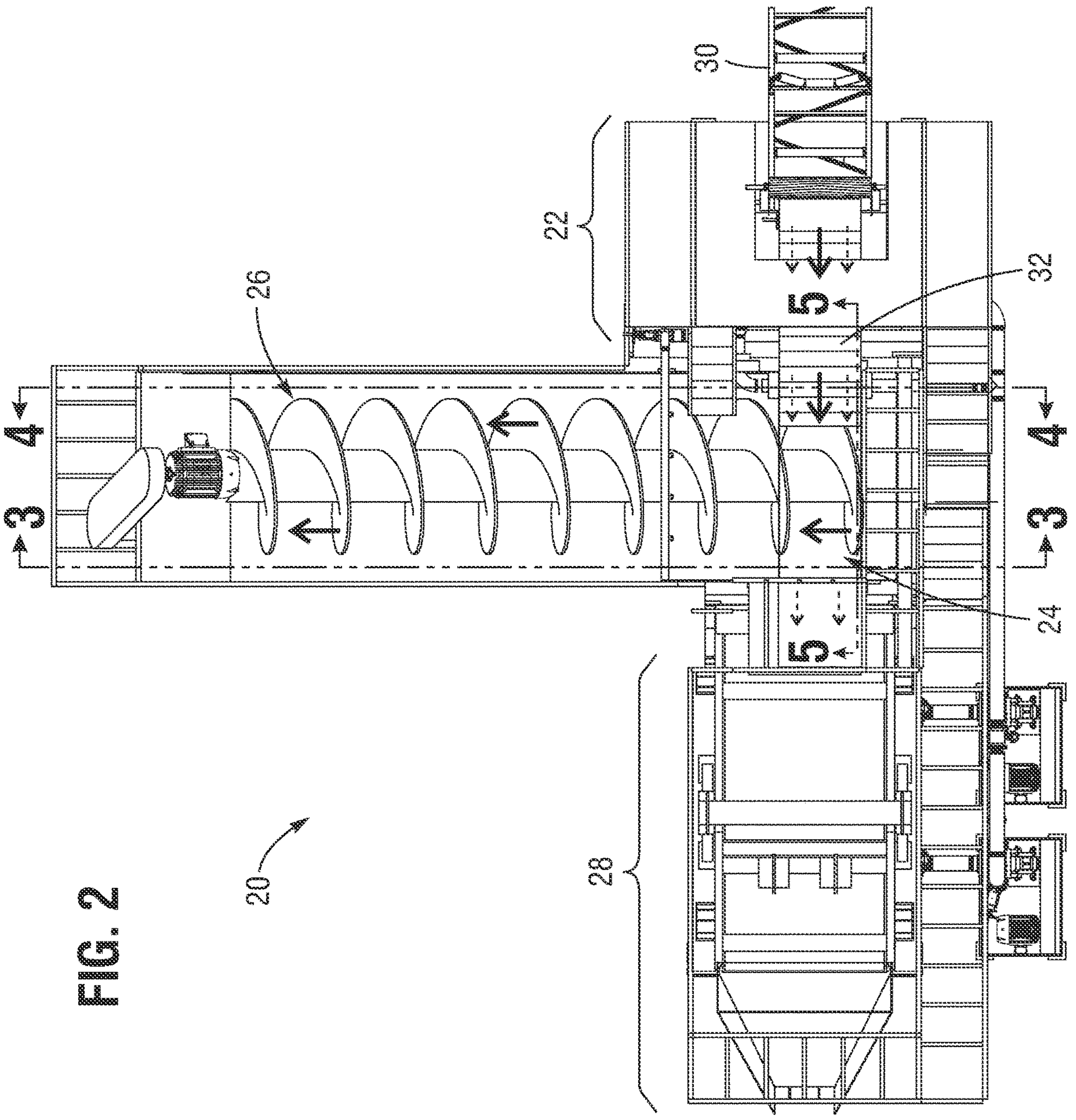
FIG. 2 is a top view of the separator system in FIG. 1.

Referring now to the side and top views of FIGS. 1 and 2, a separator system 20 is shown for sorting heavy from light materials in auto shredder residue (ASR). The system 20 can generally be divided into four main components: an ASR input subsystem 22, a material separator tank 24, a heavy matter removal subsystem 26, and a light matter removal subsystem 28. The material separator system 20 receives mixed ASR at the input subsystem 22. The mixed ASR drops down into the separator tank 24 where it is separated into heavier and lighter components, respectively. Heavier components, such as metallic objects, are removed through the heavy matter removal subsystem 26, while lighter components, such as plastic objects, exit through the light matter removal subsystem 28.

The ASR subsystem 22 typically includes an upwardly-angled feed conveyor 30 which transports mixed ASR up to the top of the separator system 20. The feed conveyor 30 may be a variety of mechanisms, such as flat, ribbed or cleated conveyor belts, a drag chain, or even Archimedes screws.

The feed conveyor 30 receives mixed ASR from a source (not shown) and carries it to a first height where it drops the mixed ASR onto a feed chute 32. It should be noted that the feed conveyor 30, feed chute 32, and the remaining components of the separator system 20 are supported by a sturdy frame or network of struts 34, as is well known in the industry. Furthermore, the struts 34 supports a network of water flow pipes 36 for supplying water to various places within the system 20. The total height of the separator system 20 may reach up to 30-40 feet tall, with a flow of mixed ASR entering from the feed conveyor 30 of up to 100 Tons Per Hour (TPH).

Figure 3:
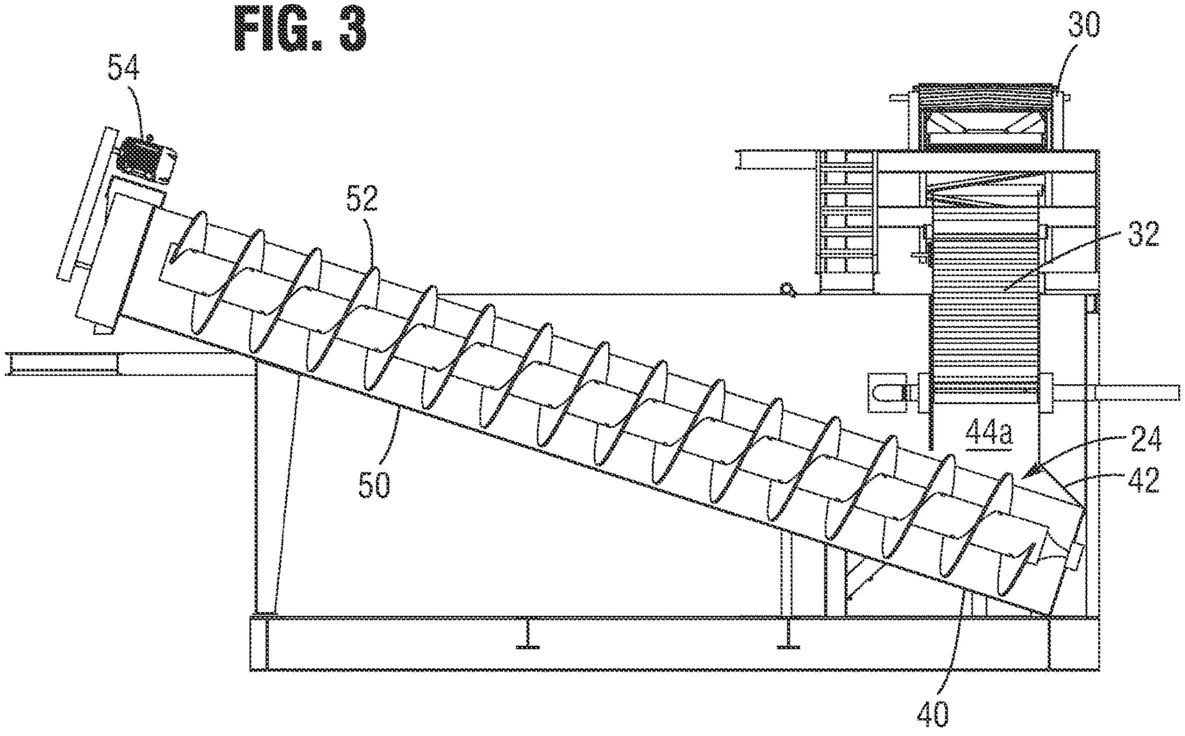
FIGS. 3 and 4 are elevational views of a heavy material conveyor of the separator system of FIG. 1, taken along lines 3-3 and 4-4, respectively shown in FIG. 2.
Figure 4:
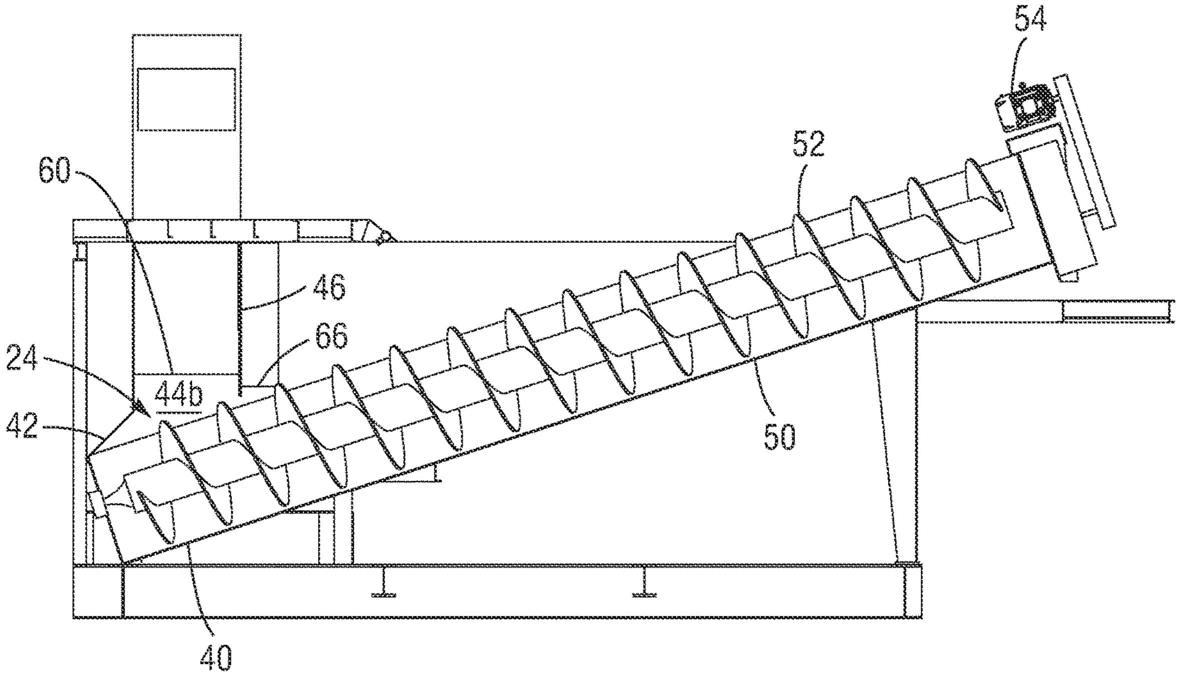

With reference also to the elevational views of FIGS. 3 and 4, the feed chute 32 is angled downward towards the separator tank 24 from the point at which it receives the mixed ASR. The chute 32 may be a simple slide, a conveyor belt, a shaker table, or may have a series of stair steps as shown to facilitate preliminary separation of the lighter and heavier materials. As the mixed ASR descends down the chute 32, heavier (typically larger) particles will tend to tumble down the stair steps while lighter (typically small) particles will be more likely to be constrained by the stair steps. The movement of heavier particles is indicated by solid lines, while the movement of lighter particles is indicated by dashed lines. In the illustrated embodiment, a nozzle 38 is positioned at an upper end of the feed chute 32 and angled downward to provide a cascading water flow down the chute and help gravity propel the ASR material toward the separator tank 24.

Now with specific reference to FIGS. 3 and 4, the relative positions of the separator tank 24 and heavy material removal subsystem 26 are shown. FIG. 3 indicates the feed conveyor 30 and feed chute 32 above and leading into the tank 24. The mixed ASR is dropped into a bath of water within the tank 24 where the heavier and lighter materials are separated. FIG. 1 schematically shows the water level in the tank 24. The separator tank 24 is defined by an upwardly angled lower chute 40, a front wall 42, a pair of sidewalls 44*a*, 44*b*, and a rear partition 46.

The upwardly angled chute 40 continues upward to define an exit chute 50 for the heavy matter removal subsystem 26. As represented in FIGS. 3 and 4, the subsystem 26 comprises an upwardly-angled conveyor such as a rotating Archimedes screw 52 extending up the exit chute 50 and driven by a motor 54. However, the conveyor may also utilize ribbed or cleated conveyor belts, a drag chain, or two or more of the screws 52. The particular configuration of the upwardly-angled conveyor may vary depending on the character of the ASR being processed. If there are two screws 52, they are placed horizontally side-by-side and rotate in opposite directions. It should be understood that the chutes 40, 50 may be contiguous and define a continuous trough over which the screw 52 or other conveyor operates so as to contain the heavy particles and any water thereon. The chutes 40, 50 may be shaped to closely conform to the underside of the screw 52 to prevent any heavy particles from getting jammed between the screw and chute. In other words, the particles are urged steadily upward in the helical spaces between the helical flutes of the screw 52, rather than dropping below the screw.

Whichever type of upwardly-angled conveyor is utilized, it transports heavy particles from the ASR upward along the exit chute 50. As the heavy particles rise out of the separator tank 24, they shed water which returns downward to the tank. At the top of the exit chute 50, the heavy particles drop or are otherwise conveyed to the next step in separator processing (not shown), such as further dewatering, drying, eddy current separating, etc.

Figure 6:
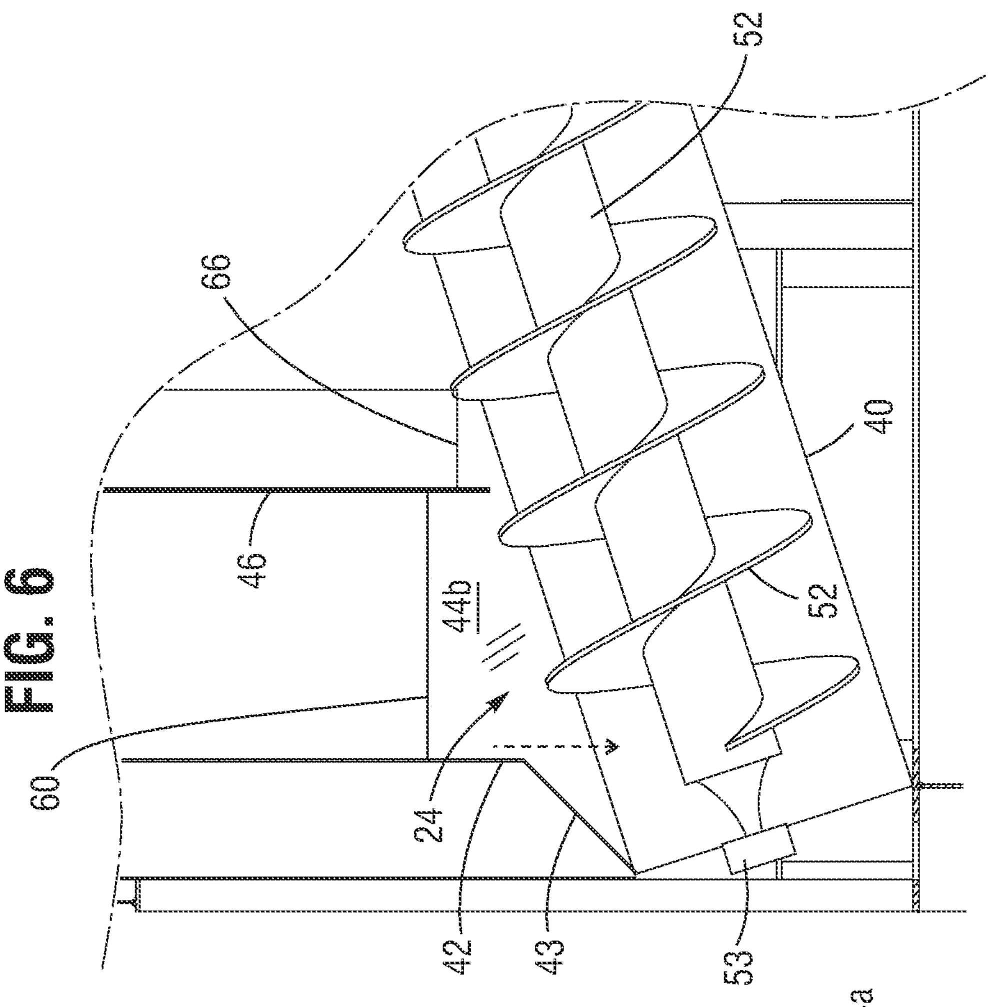
FIG. 5 is an enlarged front view of a material separator tank within the separator system and FIG. 6 is an enlarged side view thereof.
Figure 5:
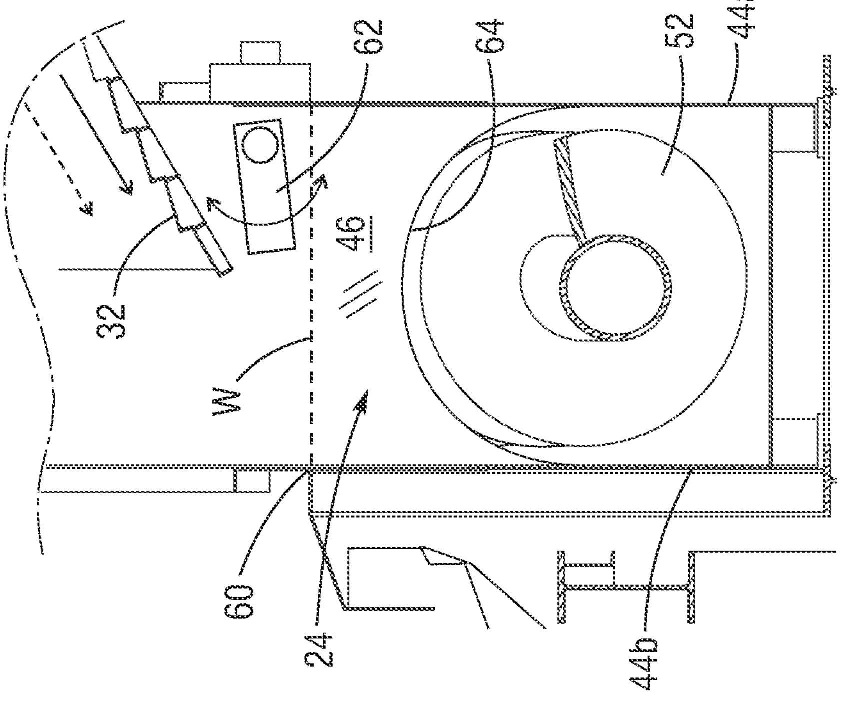
Figure 7:
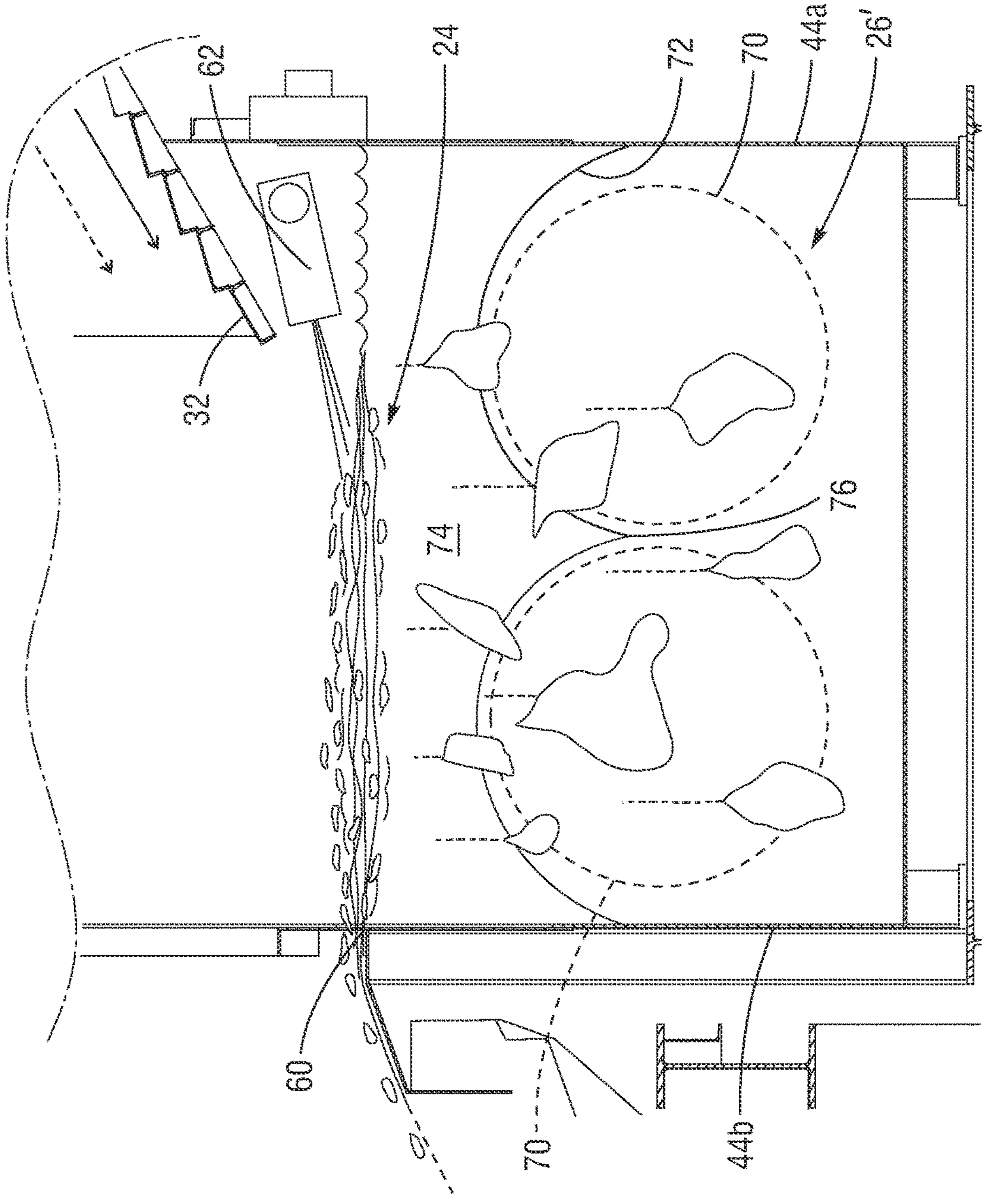
FIG. 7 is a schematic view of the material separator in use.

Returning back to the separator tank 24, and with reference to the enlarged front and side views of FIGS. 5 and 6 and schematic view of FIG. 7, the area of the separator tank 24 where the actual material separation occurs is above the Archimedes screw 52. Namely, a volume with a generally rectangular horizontal cross-section is defined by the walls 42, 44*a*, 44*b*, and 46 above the screw 52. A top edge of the sidewall 44*b* (to the left in FIG. 5) defines an exit weir 60 (see FIG. 6) over which the water and lighter particles in the separator tank 24 may spill. To encourage that spillage, at least one nozzle 62 or other such directed source of inlet water is positioned just under a lower edge of the feed chute 32 and above the water level in the tank. As seen in FIG. 7, the nozzle 62 directs water at a velocity and flow rate across the separator tank 24 towards the exit weir 60, and may be angled downward toward the water surface as shown.

The nozzle 62 is supplied with water under pressure, such as from a source of city water or at the downstream end of an elevated tank of water. The nozzle 62 may be configured in a variety of ways, such as a straight pipe or a tapered jet-style outlet. There may be a plurality of the nozzle 62 arrayed across the width of the separator tank 24, the number depending on the width. For example, four nozzles 62 are arrayed evenly across a separator tank 24 having a width of about 5 feet, or one nozzle for every foot with the end nozzles spaced 6 inches from the front wall 42 and partition wall 46.

As indicated in FIG. 5, the nozzles 62 are capable of swiveling or being angled up and down to adjust the flow. Typically, multiple nozzles 62 are fixed so as to pivot together. FIG. 7 schematically depicts movement of the water within the separator tank 24, and specifically how the nozzles 62 propel smaller and lighter particles across the tank and over the weir 60. The turbulence created near the top of the tank 24 results in separation of the larger particles that the sink towards the bottom of the tank, from there to be conveyed upward by the heavy matter removal subsystem 26. The velocity and flow rate of the water directed into the separator tank 24 from the nozzles 62, and the angle of the nozzles, may be varied depending on the character of the mixed ASR. Those of skill in the art will understand that a moderate amount of experimentation with any particular configuration and ASR character will determine optimum operating parameters.

FIGS. 5 & 6 show the preferred shape of the partition 46 extending downward below the water level W in the separator tank 24. In the illustrated embodiment, the partition 46 has a semi-circular lower edge 64 which conforms closely to the circular boundary of the rotating conveyor screw 52. Only particles that drop below the lower edge 64 end up being conveyed upward by the heavy matter removal subsystem 26. Because of the turbulence caused by the nozzles 62 and gross movement of water toward and over the exit weir 60, almost all of the smaller and lighter particles remain higher up in the second 24 and exit over the weir 60. This is also indicated schematically in FIG. 7.

FIG. 6 also shows how the front wall 42 descends vertically downward from the weir 60 to provide a border on the front for the separator tank 24, but then angles outward at 43 (frontward, to the left) as it gets close to the screw 52. This helps keep the sinking particles dropping in line with the first helical flute of the screw 52, as indicated by the dashed arrow, while providing some relief space for a non-drive bearing 53 located at the lowest end of the lower chute 40. Also, the lower, front end of the chute 40 is angled perpendicular to the axis of the screw 52 to further eliminate dead space. There is thus less chance for heavy particles to find their way to the very bottom (dead space) of the lower chute 40 and stay there, possibly causing a jam.

FIGS. 4 & 6 illustrate a secondary weir 66 positioned on the opposite side of the partition 46 from the separator tank 24. That is, the weir 66 is located upward along the path of the lower chute 40 and exit chute 50. The secondary weir 66 ensures that the water level along the exit chute 50 remains near the bottom of the chute, which facilitates draining and ultimately drying of the heavy particles that are transported up the chute. The secondary weir 66 is positioned lower than the exit weir 60. Because of the continuous input of water from the nozzles 62, the water level W within the separator tank 24 remains close to or slightly greater than the height of the exit weir 60. That is, the exit weir 60 generally determines the water level within the separator tank 24, though the height of the secondary weir 66 is obviously also relevant. In the illustrated embodiment, the secondary weir 66 is positioned at an elevation just below the exit weir 60, such as between about 3-6 inches below. Of course, certain other factors such as the total volume in the separator tank 24, as well as the number of nozzle 62 and their exit velocity affect the water level within the separator tank 24, but the absolute and relative heights of the exit weir 60 and secondary weir 66 are primary contributors.

FIG. 7 schematically illustrates an alternative heavy matter removal subsystem 26' defined by a pair of side-by-side upwardly-angled conveyor screws 70. The heavy particles fall downward below the lower edge 72 of a partition wall 74, and are transported upwards by the screws 70, much as described above with respect to a single screw. It should be noted that the lower edge 72 of the partition wall 74 is contoured so as to generally match the profile of the upper halves of the screws 70. That is, the lower edge 72 is formed by two generally semi-circular curves extending downward to an apex 76 in the middle between the two screws 70. Shaping the partition wall 74 to closely conform to the dual screws 70 helps prevent smaller and lighter particles from escaping underneath the partition wall 74, thus making the separation process more efficient.

Reference back to FIGS. 1 & 2, it is seen that the lighter particles pass over the exit weir 60 to the light matter removal subsystem 28. In one embodiment, the process and 28 comprises a dewatering device 80, such as a shaker screen or perforated conveyor located above a water tank 82. Most of the water from the lighter particles is thus removed, and further drying may or may not be needed.

While the foregoing is a complete description of the preferred embodiments of the invention, various alternatives, modifications, and equivalents may be used. Moreover, it will be obvious that certain other modifications may be practiced within the scope of the appended claims.

It is claimed:

1. A system for separating heavier from lighter materials within a stream of mixed auto shredder residue (ASR), comprising:

a separator tank configured to contain water and defined by solid walls including a pair of opposed vertical sidewalls a first one of which defines a horizontal exit weir, a front wall extending between the sidewalls above and below the exit weir that generally determines a water level within the separator tank, a lower wall commencing at a front end at the front wall and extending between the sidewalls in a rearward direction to a height above the exit weir, and a rear partition wall opposite the front wall and extending between the sidewalls above and below the exit weir, the rear partition wall terminating at a lower edge above the lower wall to form a space therebetween, the separator tank defining a side-to-side direction extending between the sidewalls perpendicular to a front-to-rear direction extending between the front wall and the rear partition wall;

an inlet feed conveyor configured to receive a stream of mixed ASR having lighter particles and heavier particles and deliver the stream of mixed ASR to an upper end of a feed chute, wherein the lighter particles have a relatively lesser specific gravity than the heavier particles, the feed chute being angled downward to a lower end positioned above the water level at a location close to a second sidewall opposite the first sidewall so that mixed ASR falls into the tank from the lower end of the feed chute;

at least one nozzle located underneath the lower end of the feed chute configured to introduce water at a velocity into the separator tank and aimed to direct water in the side-to-side direction across the separator tank toward the exit weir, the flow of water across the separator tank tending to push smaller and lighter particles over the exit weir, wherein the heavier particles tend to sink within the separator tank and therefore be separated from the lighter particles; and a heavy matter removal conveyor having a lower end positioned within the separator tank above the front end of the lower wall, the heavy matter removal conveyor being angled upward so that the heavier particles that sink downwards land on and are transported upward out of the separator tank in the front-to-rear direction.

2. The system of claim 1, further including a water flow nozzle positioned at the top of the feed chute to facilitate movement of the mixed ASR down the feed chute.

3. The system of claim 2, wherein the feed chute has a series of spaced stair steps that help separate heavier from lighter particles.

4. The system of claim 1, wherein the heavy matter removal conveyor comprises at least one Archimedes screw.

5. The system of claim 4, wherein the partition wall lower edge is shaped to conform to the at least one Archimedes screw.

6. The system of claim 4, wherein the heavy matter removal conveyor comprises two Archimedes screws arranged side-by-side.

7. The system of claim 6, wherein the partition wall lower edge is shaped to conform to both Archimedes screws.

8. The system of claim 1, wherein there are a plurality of nozzles spaced apart in a line in the front-to-rear direction.

9. The system of claim 1, wherein the lower wall defines an upwardly angled lower chute commencing at the lower end at the front wall and extending in a rearward direction parallel under the heavy matter removal conveyor past the partition wall to define an exit chute that rises to a height above the exit weir.

10. The system of claim 9, further including a secondary weir on an opposite side of the partition wall from the exit weir that is positioned lower than the exit weir so that a secondary water level along the exit chute remains near the bottom of the exit chute adjacent the partition wall.

11. A system for separating heavier from lighter materials within a stream of mixed auto shredder residue (ASR), comprising:

a separator tank configured to contain water and defined by solid walls including a pair of opposed vertical sidewalls a first one of which defines a horizontal exit weir that generally determines a water level within the separator tank, a front wall extending between the sidewalls above and below the exit weir, an upwardly angled lower chute commencing at a lower end at the front wall and extending between the sidewalls upward in a rearward direction, and a rear partition wall opposite the front wall and extending between the sidewalls above and below the exit weir, the rear partition wall terminating at a bottom end above the lower chute to form a space therebetween, wherein the upwardly angled lower chute continues past the partition wall to define an exit chute that rises to a height above the exit weir, the separator tank defining a side-to-side direction extending between the sidewalls perpendicular to a front-to-rear direction extending between the front wall and the rear partition wall;

an inlet feed conveyor configured to receive a stream of mixed ASR having lighter particles and heavier particles and deliver the stream of mixed ASR to an upper end of a feed chute, wherein the lighter particles have a relatively lesser specific gravity than the heavier particles, the feed chute being angled downward to a lower end positioned above the water level at a location close to a second sidewall opposite the first sidewall so that mixed ASR falls into the tank from the lower end of the feed chute;

at least one nozzle located underneath the lower end of the feed chute configured to introduce water at a velocity into the separator tank and aimed to direct water in the side-to-side direction across the separator tank toward the exit weir, the flow of water across the separator tank tending to push smaller and lighter particles over the exit weir, wherein the heavier particles tend to sink within the separator tank and therefore be separated from the lighter particles;

a heavy matter removal conveyor having a lower end positioned within the separator tank above the lower chute, the heavy matter removal conveyor being angled upward so that the heavier particles that sink downwards land on and are transported upward out of the separator tank in the front-to-rear direction; and a secondary weir on an opposite side of the partition wall from the exit weir that is positioned lower than the exit weir so that a secondary water level along the exit chute remains near the bottom of the exit chute adjacent the partition wall.

12. The system of claim 11, wherein the secondary weir is positioned 3-6 inches lower than the exit weir.

13. The system of claim 11, further including a water flow nozzle positioned at the top of the feed chute to facilitate movement of the mixed ASR down the feed chute.

14. The system of claim 13, wherein the feed chute has a series of spaced stair steps that help separate heavier from lighter particles.

15. The system of claim 11, wherein the heavy matter removal conveyor comprises at least one Archimedes screw.

16. The system of claim 15, wherein the heavy matter removal conveyor comprises two Archimedes screws arranged side-by-side.

17. The system of claim 16, wherein the partition wall lower edge is shaped to conform to both Archimedes screws.

18. The system of claim 11, wherein the heavy matter removal conveyor comprises a conveyor selected from the group consisting of a flat, ribbed or cleated conveyor and a drag chain.

19. The system of claim 11, wherein there are a plurality of nozzles spaced apart in a line in the front-to-rear direction.

20. The system of claim 11, wherein the at least one nozzle is mounted to pivot to change the angle of the flow of water across the separator tank.

* * * * *